(12) United States Patent
Sasaki et al.

(10) Patent No.: US 11,610,086 B2
(45) Date of Patent: Mar. 21, 2023

(54) APPARATUS FOR DISPLAYING INSTRUCTIONS BASED ON AN EVENT IN A RECORDING APPARATUS

(71) Applicant: SEIKO EPSON CORPORATION, Tokyo (JP)

(72) Inventors: Keisuke Sasaki, Matsumoto (JP); Nobuhisa Nomoto, Matsumoto (JP); Katsumi Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/351,193

(22) Filed: Jun. 17, 2021

(65) Prior Publication Data
US 2021/0397909 A1    Dec. 23, 2021

(30) Foreign Application Priority Data

Jun. 19, 2020   (JP) .............................. JP2020-106142

(51) Int. Cl.
*G06K 15/00*     (2006.01)
*G06K 15/16*     (2006.01)

(52) U.S. Cl.
CPC ........... *G06K 15/002* (2013.01); *G06K 15/16* (2013.01); *G06K 15/40* (2013.01)

(58) Field of Classification Search
CPC ...................................................... G06K 15/16
See application file for complete search history.

(56) References Cited

U.S. PATENT DOCUMENTS

| | | | | |
|---|---|---|---|---|
| 2006/0072955 A1* | 4/2006 | Narita | ..................... | B41J 29/02 400/642 |
| 2014/0285592 A1* | 9/2014 | Koike | .................. | B41J 2/17513 206/524.6 |
| 2015/0092229 A1* | 4/2015 | Miyazaki | .............. | G06F 3/0416 358/1.15 |
| 2015/0375955 A1* | 12/2015 | Kanematsu | ........ | G03G 15/6594 271/2 |
| 2016/0048748 A1* | 2/2016 | Akahira | ............ | G06K 15/4095 358/1.13 |
| 2016/0344877 A1* | 11/2016 | Altamirano | ........ | H04N 1/00493 |
| 2017/0344929 A1* | 11/2017 | Matsumura | ............ | G06Q 10/20 |
| 2018/0016107 A1* | 1/2018 | Ngoc | ....................... | B65H 5/06 |
| 2019/0364169 A1* | 11/2019 | Iida | .................... | H04N 1/00477 |
| 2020/0133183 A1* | 4/2020 | Makino | .............. | G03G 15/5016 |

FOREIGN PATENT DOCUMENTS

JP         2012000898 A     1/2012

\* cited by examiner

*Primary Examiner* — Benjamin O Dulaney
(74) *Attorney, Agent, or Firm* — Chip Law Group

(57) ABSTRACT

A non-transitory computer-readable storage medium storing a program is provided. The program is executed in a personal digital assistant to operate a recording apparatus including a recording unit that performs recording on a medium from the personal digital assistant. The program causes the personal digital assistant to display, on a display of the personal digital assistant, information on a user operation method based on an event that occurred when a medium is to be fed from back of the recording apparatus, the method being to be performed after the event occurred.

8 Claims, 17 Drawing Sheets

APPARATUS FOR DISPLAYING INSTRUCTIONS BASED ON AN EVENT IN A RECORDING APPARATUS

The present application is based on, and claims priority from JP Application Serial Number 2020-106142, filed Jun. 19, 2020, the disclosure of which is hereby incorporated by reference herein in its entirety.

BACKGROUND

1. Technical Field

The present disclosure relates to a non-transitory computer-readable storage medium storing a program to be executed in a personal digital assistant to operate a recording apparatus including a recording unit from the personal digital assistant. The recording unit performs recording on a medium. The present disclosure also relates to a recording apparatus that performs printing on a medium. The present disclosure also relates to a recording system including a recording apparatus that performs printing on a medium and a personal digital assistant configured to communicate with the recording apparatus.

2. Related Art

Many recording apparatuses typified by printers employ a configuration in which an operation panel is disposed on the front of the apparatuses, as disclosed in JP-A-2012-000898. The operation panel includes a display for various displays.

Recording apparatuses are often configured to be operated from the back of the apparatuses. The multifunctional apparatus disclosed in JP-A-2012-000898 includes a jam clear cover at the back of the apparatus and is configured to perform jam clearing from the back of the apparatus by opening the cover. However, some users do not know how to operate the apparatus from the back of the apparatus. Some recording apparatuses display the operation method on the displays of the apparatuses. However, with the configuration in which the operation panel is disposed at the front of the apparatus, the user cannot operate the apparatus from the back while viewing the operation method, which hampers user convenience.

SUMMARY

According to a first aspect of the present disclosure, a non-transitory computer-readable storage medium storing a program is provided. The program is executed in a personal digital assistant to operate a recording apparatus including a recording unit that performs recording on a medium from the personal digital assistant. The program causes the personal digital assistant to display, on a display of the personal digital assistant, information on a user operation method based on an event that occurred when a medium is to be fed from back of the recording apparatus, the method being to be performed after the event occurred.

According to a second aspect of the present disclosure, a recording apparatus is provided which includes a recording unit that performs recording on a medium, a feeding path that feeds a medium from back of the recording apparatus including the recording unit, and a control unit that performs various controls of the recording apparatus. When the control unit detects an event that occurred when a medium is to be fed through the feeding path in a state in which communication with a personal digital assistant is established, the control unit notifies the personal digital assistant of the detection.

According to a third aspect of the present disclosure, a recording system includes a recording apparatus that performs recording on a medium and a personal digital assistant configured to communicate with the recording apparatus. When the recording apparatus detects an event that occurred when a medium is to be fed from back of the recording apparatus, the recording apparatus notifies the personal digital assistant of the detection. In response to the notification, the personal digital assistant displays information on a user operation method subsequent to occurrence of the event on a display of the personal digital assistant.

DESCRIPTION OF EXEMPLARY EMBODIMENTS

Figure 1:
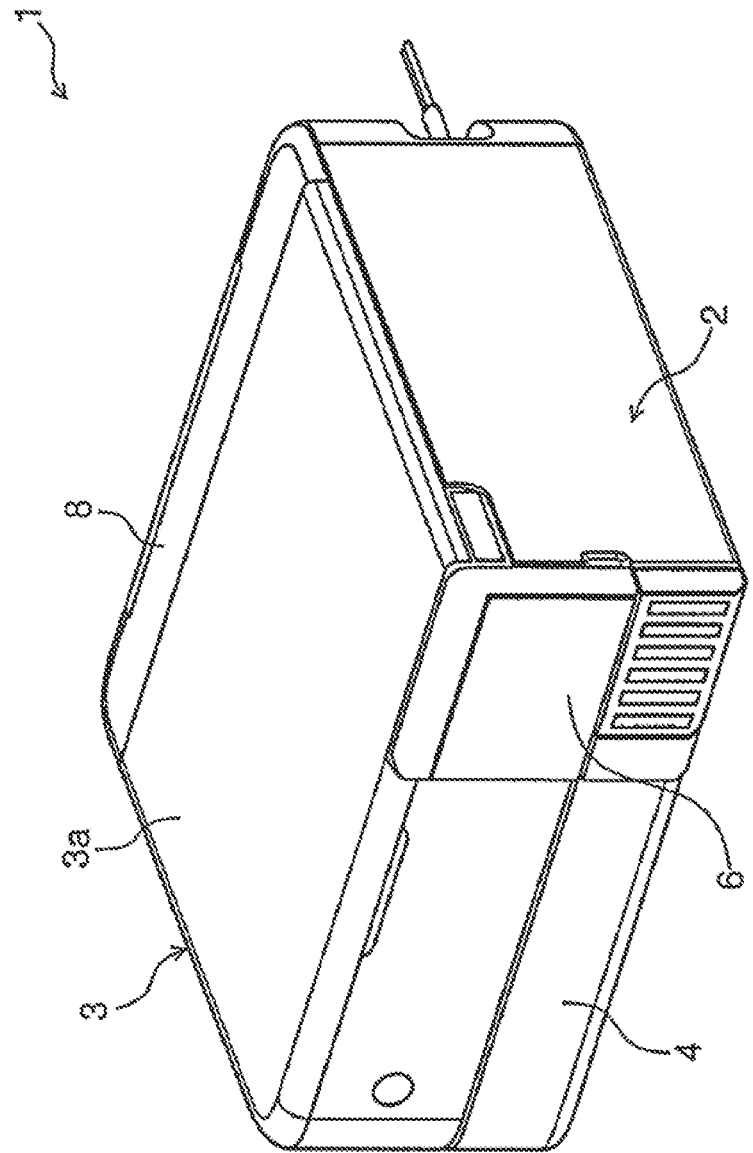
FIG. 1 is a perspective view of a printer seen from the front.

The present disclosure will be schematically described hereinbelow. According to a first aspect of the present disclosure, a non-transitory computer-readable storage medium storing a program is provided. The program is executed in a personal digital assistant to operate a recording apparatus including a recording unit that performs recording on a medium from the personal digital assistant. The program causes the personal digital assistant to display, on a display of the personal digital assistant, information on a user operation method based on an event that occurred when a medium is to be fed from back of the recording apparatus, the method being to be performed after the event occurred.

According to this aspect, the information on a user operation method to be performed after an event occurred when a medium is to be fed from the back of the recording apparatus is displayed on the display of the personal digital assistant on the basis of the event. This allows the user to easily see the operation method when feeding a medium from the back of the recording apparatus, improving the user convenience.

According to a second aspect, in the first aspect, the event is a notification from the recording apparatus to the personal digital assistant that a unit that closes a feeding path for feeding a medium from the back of the recording apparatus was detached.

The fact that the unit that closes the feeding path for feeding a medium from the back of the recording apparatus was detached indicates the intention of the user to feed a medium from the back of the recording apparatus. In this aspect, since the event is a notification from the recording apparatus to the personal digital assistant that the unit that closes the feeding path for feeding a medium from the back of the recording apparatus was detached, an appropriate operation method corresponding to the action of the user can be presented.

According to a third aspect, in the first aspect, the event is a notification from the recording apparatus to the personal digital assistant that a path forming member forming a feeding path for feeding a medium from the back of the recording apparatus was attached to the recording apparatus.

The fact that the path forming member forming a feeding path for feeding a medium from the back of the recording apparatus was attached to the recording apparatus indicates the intention of the user to feed a medium from the back of the recording apparatus. In this aspect, since the above event is a notification from the recording apparatus to the personal digital assistant that the path forming member forming a feeding path was attached to the recording apparatus to form a medium feeding path, an appropriate operation method corresponding to the action of the user can be presented.

According to a fourth aspect, in the first aspect, the event is a notification from the recording apparatus to the personal digital assistant that a motion sensor provided at the back of the recording apparatus detected a person.

The fact that the motion sensor disposed at the back of the recording apparatus detected a person indicates a possibility that the user will feed a medium from the back of the recording apparatus. In this aspect, since the above event is a notification from the recording apparatus to the personal digital assistant that the motion sensor disposed at the back of the recording apparatus detected a person, an appropriate operation method corresponding to the action of the user can be presented.

According to a fifth aspect, in one of the first to fourth aspects, the information on the user operation method includes at least one of a still image and a moving image. According to this aspect, the information on the user operation method includes at least one of a still image and a moving image to the information on the user operation method. This makes it easy for the user to visually understand the user operation method.

A recording apparatus according to a sixth aspect includes a recording unit that performs recording on a medium, a feeding path that feeds a medium from back of the recording apparatus including the recording unit, and a control unit that performs various controls of the recording apparatus, wherein, when the control unit detects an event that occurred in the state of a medium is to be fed through the feeding path in a state in which communication with a personal digital assistant is established, the control unit notifies the personal digital assistant of the detection.

According to this aspect, when the control unit detects an event that occurred when a medium is to be fed through the feeding path in a state in which communication with a personal digital assistant is established, the control unit notifies the personal digital assistant of the detection. In response to the notification, the personal digital assistant can display information on a user operation method subsequent to occurrence of the event on a display of the personal digital assistant. This allows the user to easily see the operation method when feeding a medium from the back of the recording apparatus, improving the user convenience.

A recording system according to a seventh aspect includes a recording apparatus that performs recording on a medium and a personal digital assistant configured to communicate with the recording apparatus, wherein, when the recording apparatus detects an event that occurred when a medium is to be fed from back of the recording apparatus, the recording apparatus notifies the personal digital assistant of the detection, and wherein, in response to the notification, the personal digital assistant displays information on a user operation method subsequent to occurrence of the event on a display of the personal digital assistant.

According to this aspect, the information on the user operation method to be performed after an event occurred when a medium is to be fed from the back of the recording apparatus is displayed on the display of the personal digital assistant on the basis of the event. This allows the user to easily see the operation method when feeding a medium from the back of the recording apparatus, improving the user convenience.

According to an eighth aspect, in the seventh aspect, the recording apparatus includes an operation panel that displays various kinds of information at front of the recording apparatus, wherein the operation panel of the recording apparatus and the display of the personal digital assistant display same information. This improves the user convenience.

According to a ninth aspect, in the eighth aspect, display on the operation panel of the recording apparatus and display on the display of the personal digital assistant are synchronized with each other. This further improves the user convenience.

The present disclosure will be specifically described hereinbelow. An ink jet printer 1 will be described as an example of the recording apparatus. The ink jet printer 1 is hereinafter simply referred to as "printer 1". In the X-Y-Z coordinate system in the drawings, the X-axis direction is the width direction of the apparatus, which is the width direction of the record medium. The Y-axis direction is the depth direction of the apparatus, which is the direction along the medium transport direction during recording. The +Y direction is the direction from the back of the apparatus to the front, and the −Y direction is the direction from the front of the apparatus to the back. In this embodiment, of the sides constituting the periphery of the printer 1, the side on which an operation panel 6 is disposed, that is, the side in the +Y direction, is the front of the apparatus, and the side in the −Y direction is the back of the apparatus. The Z-axis direction is the vertical direction, which is the height direction of the apparatus. The +Z direction is the vertically upward direction, and the −Z direction is the vertically downward direction.

The direction in which media are fed is sometimes referred to as "downstream", and the direction opposite thereto is sometimes referred to as "upstream". In this specification, ejection of ink from a record head 17 (described later) onto a medium is expressed using the term "recording" or the term "printing". "Printing" is one form of "recording", either of which refers to ejection of ink from the record head 17 to a medium.

Figure 2:
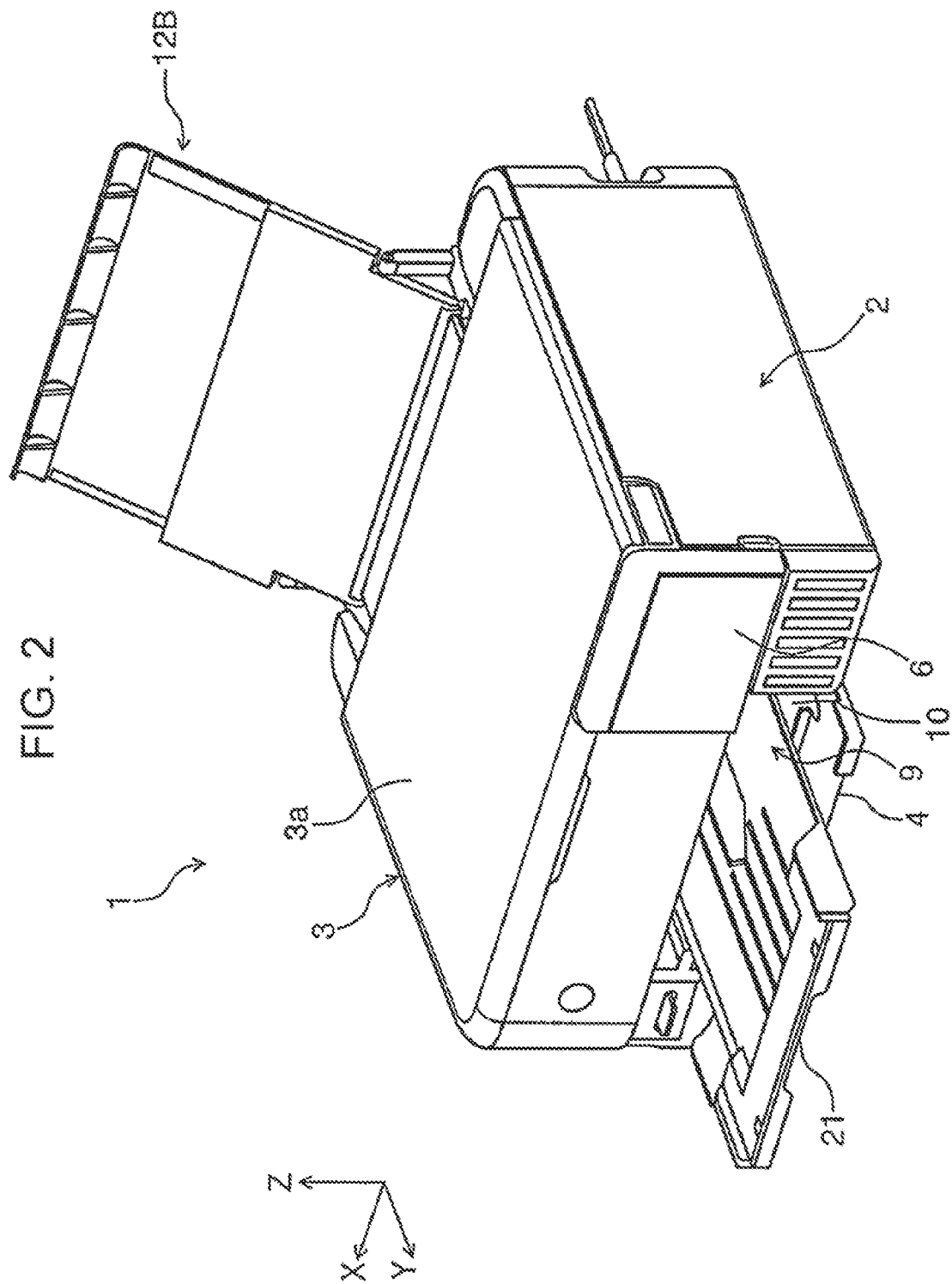
FIG. 2 is a perspective view of the printer seen from the front.

In FIGS. 1 and 2, the printer 1 includes a scanner 3, which is an example of an image reading apparatus, at the upper part of an apparatus main body 2 that performs ink jet recording on a medium. In other words, the printer 1 is configured as a multifunctional apparatus having an original scanning function in addition to an ink jet recording function. An example of the medium is recording paper. The scanner 3 is configured to rotate with respect to the apparatus main body 2 and to switch between a closed state (shown in FIG. 1) and an open state (not shown) by rotating. The scanner 3 includes an original cover 3a that opens and closes a platen 3b (see FIG. 3). A scan sensor 3c (see FIG. 3) is provided below the platen 3b (see FIG. 3). The scan sensor 3C extends in the Y-axis direction and is moved in the X-axis direction by a sensor motor 3d (see FIG. 9). In other words, the scanner 3 is a flat-bed image reading apparatus.

As shown in FIGS. 1 and 2, the apparatus main body 2 includes an operation panel 6 at the front, which is used for various operation settings and displaying record settings and recorded image previews. The operation panel 6 in this embodiment is configured as a touch panel and implements a user interface (hereinafter referred to as "UI") that displays various kinds of information and receives various setting operations performed by the user. In other words, the operation panel 6 functions as a display that displays various kinds of information in the printer 1. The user performs various setting operations and executing operations according the UI displayed on the operation panel 6.

The apparatus main body 2 includes a front cover 4 at the front. By opening the front cover 4, a medium cassette 10, a medium discharge port 9, a medium receiving tray 21, and so on are exposed. The apparatus main body 2 includes an openable and closable top cover 8 at the rear upper surface of the apparatus. By opening the top cover 8, an extension support portion 12B can be expanded. The extension support portion 12B is at a position where the back of a reversing unit 24 (described later) is covered in a housed state, as indicated by the two-dot chain line and reference sign 12B-1 in FIG. 3. Thus, when the reversing unit 24 is to be removed, the extension support portion 12B in the housed state is drawn upward.

Figure 3:
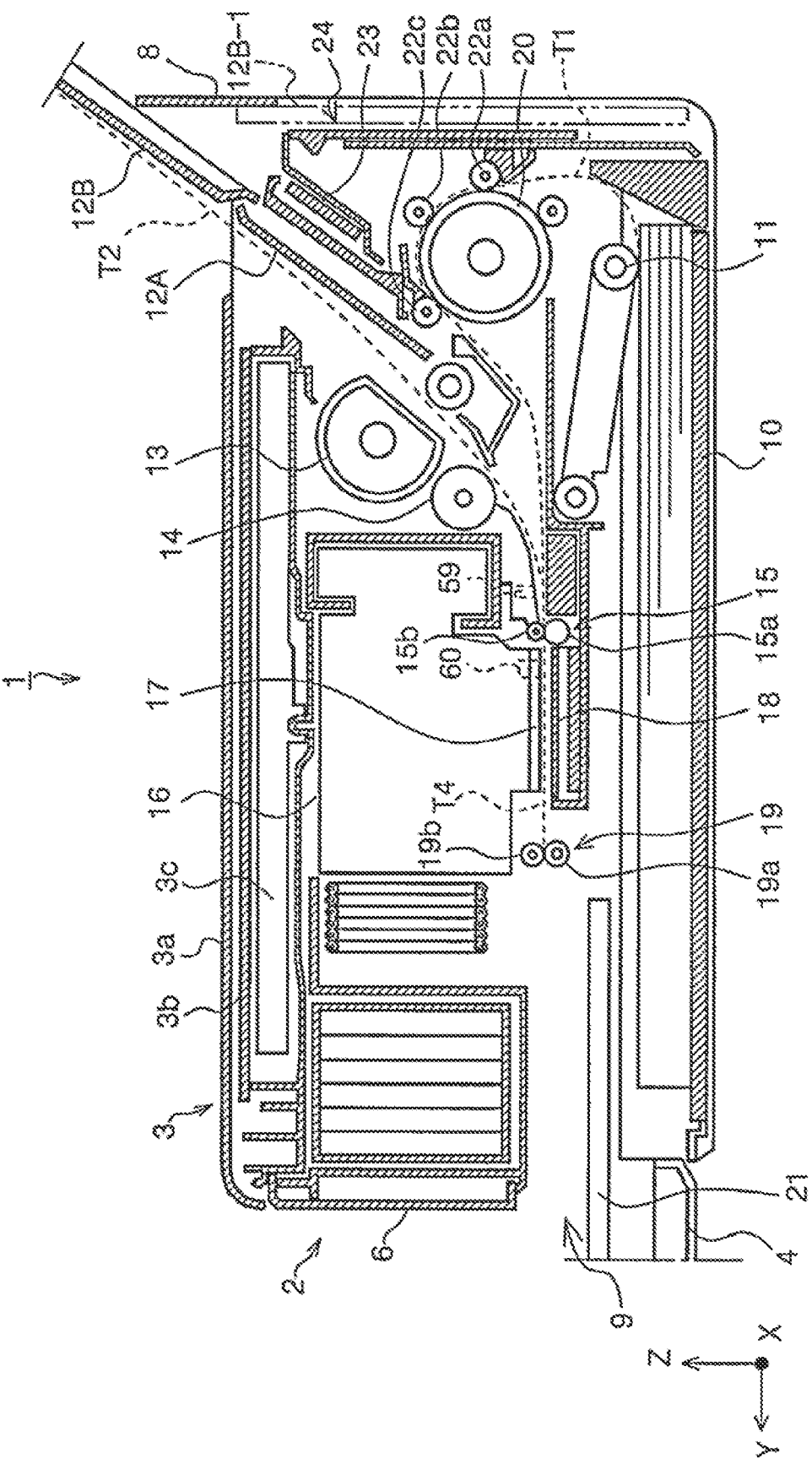
FIG. 3 is a diagram illustrating medium transport paths in the printer.
Figure 4:
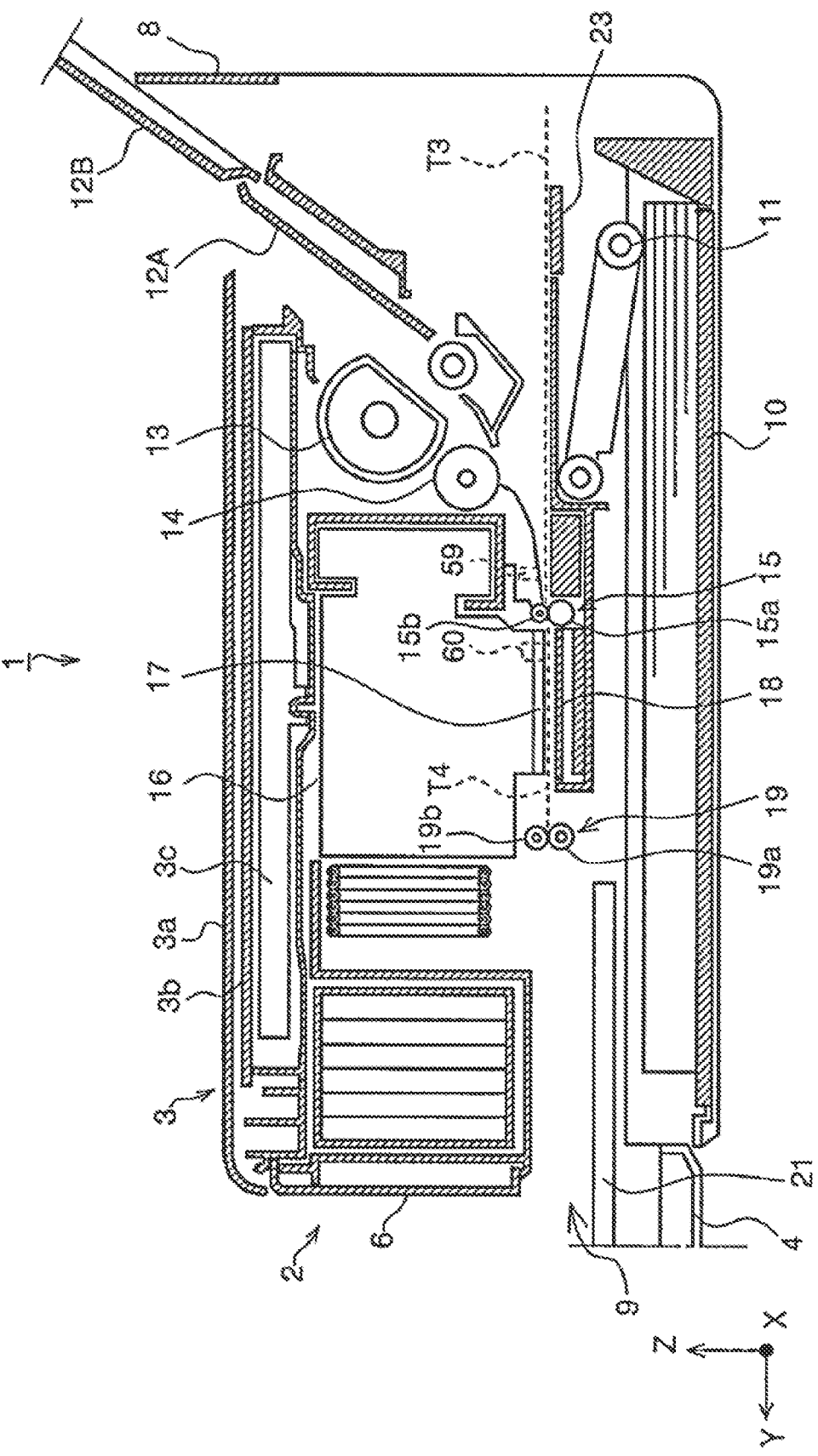
FIG. 4 is a diagram illustrating a medium transport path in the printer.

Referring next to FIGS. 3 and 4, the medium feeding paths of the printer 1 will be described. The printer 1 has three medium feeding paths: a medium feeding path T1 for feeding a medium from the medium cassette 10 at the bottom of the apparatus, a medium feeding path T2 for feeding the medium from the upper rear of the apparatus, and a medium feeding path T3 (see FIG. 4) for feeding the medium from the back of the apparatus. Reference sign T4 denotes a medium transport path between a feed roller pair 15 and a discharge roller pair 19. All of the medium feeding paths T1, T2, and T3 connect to the medium transport path T4.

On the medium feeding path T1, the medium is fed out from the medium cassette 10 serving as a medium container in the −Y direction by a pick roller 11 and is curved and reversed by a reverse roller 20 in the +Y direction toward the record head 17, specifically, toward a feed roller pair 15. Thus, the medium feeding path T1 includes a curving and reversing path along which the medium fed out from the medium cassette 10 is curved and reversed by the reverse roller 20. The pick roller 11 and the reverse roller 20 are powered by a transport motor 53 (see FIG. 9). Driven rollers 22a, 22b, and 22c are provided along the outer circumference of the reverse roller 20.

On the medium feeding path T2, a medium supported at an inclined orientation by an inclination support portion 12A and the extension support portion 12B is fed by a feeding roller 13 and an auxiliary roller 14 toward the feed roller pair 15. In other words, the medium feeding path T2 is a path for feeding a medium set at the upper rear of the apparatus. The feeding roller 13 and the auxiliary roller 14 are powered by the transport motor 53 (see FIG. 9).

The medium feeding path T3 is a path for manually feeding a medium from the back of the apparatus to the front. The medium feeding path T3 is a substantially straight path, and in this embodiment, extends in the horizontal direction. The medium feeding path T3 is formed by removing the reversing unit 24 from the back of the apparatus main body 2, removing an adaptor 23 provided at the reversing unit 24, and attaching the adaptor 23 to the apparatus main body 2, as shown in FIG. 4. In other words, the reversing unit 24 is a unit that closes the medium feeding path T3 when attached.

Figure 5:
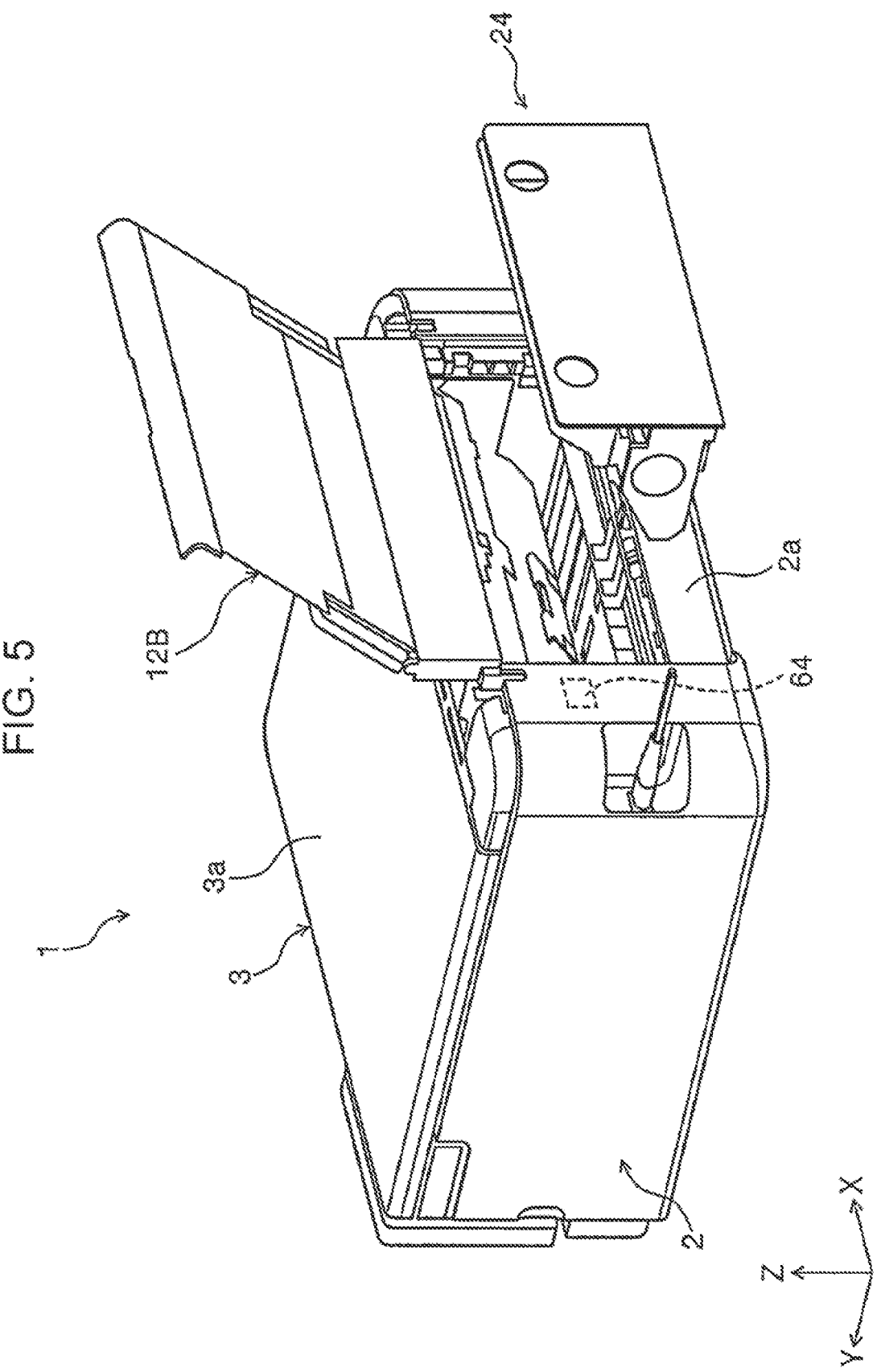
FIG. 5 is a perspective view of the printer seen from the back.
Figure 6:
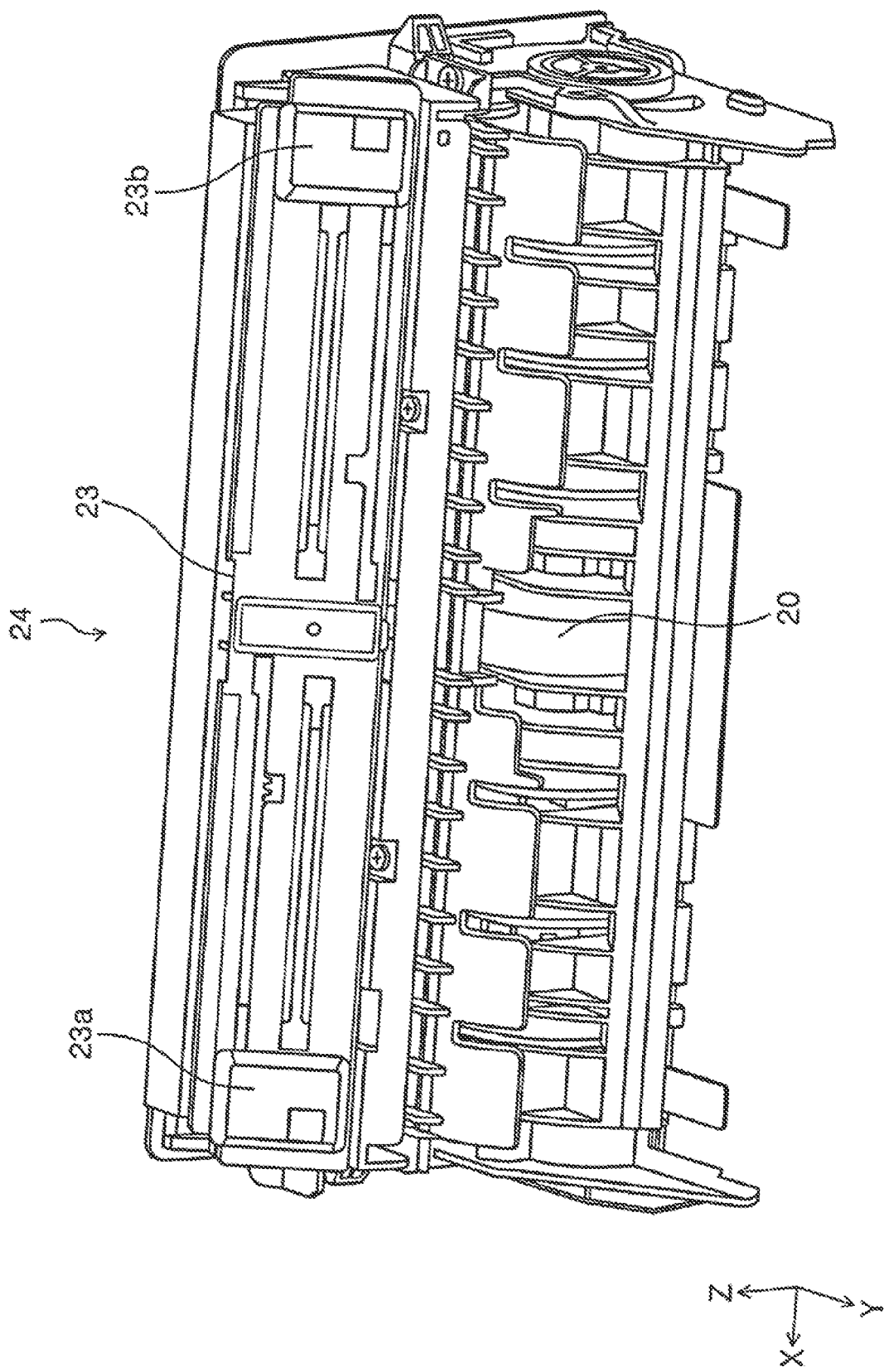
FIG. 6 is a perspective view of a reversing unit.
Figure 7:
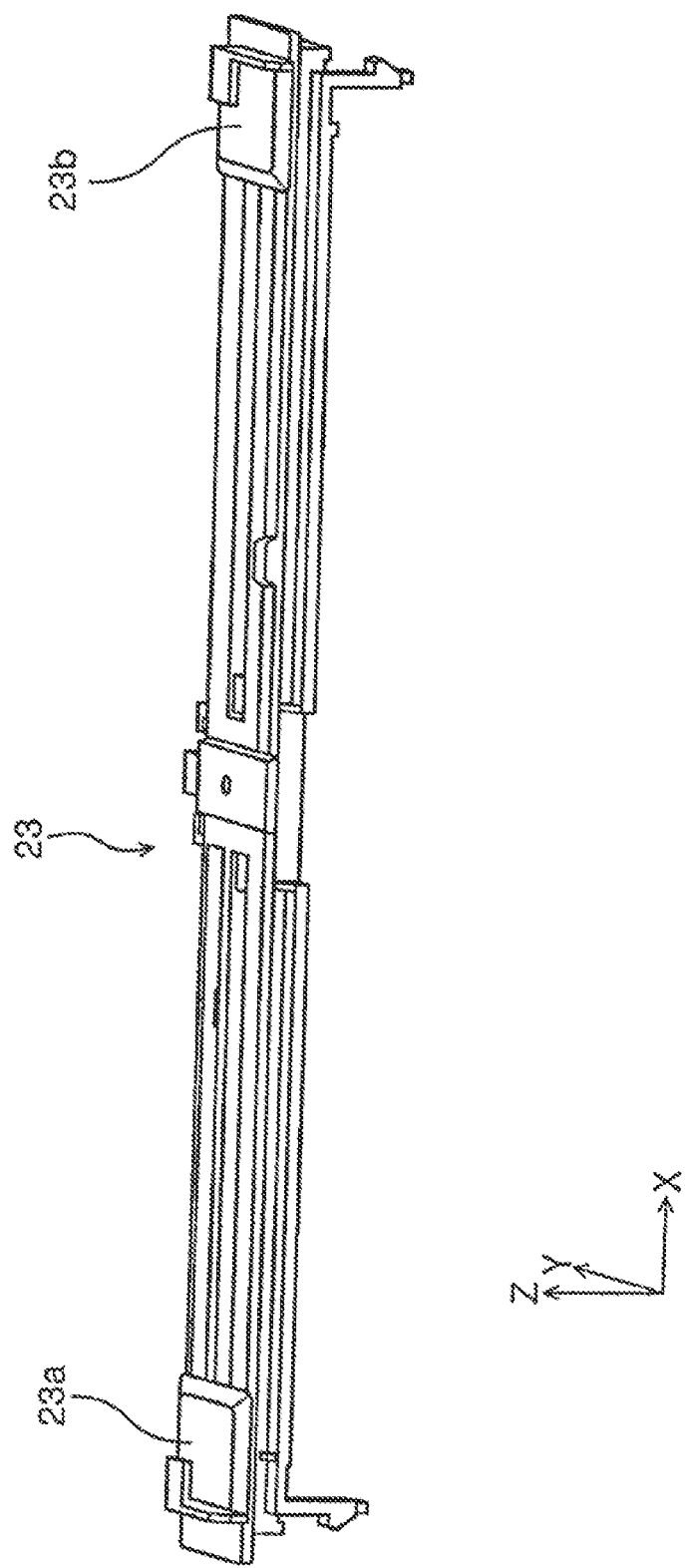
FIG. 7 is a perspective view of an adaptor.

The reversing unit 24 is configured to be removed in the −Y direction from the back of the apparatus main body 2, as shown in FIG. 5, and is configured as a unit including the reverse roller 20, as shown in FIG. 6. The adaptor 23 is attached in the +Y direction at the upper part of the reversing unit 24, as shown in FIG. 6. When a medium is to be fed using the medium feeding path T3, the adaptor 23 is removed from the reversing unit 24 and is attached to the printer 1, as shown in FIG. 4. The adaptor 23 includes edge guides 23a and 23b, as shown in FIG. 7. The edge guides 23a and 23b are configured to come close to and away from each other by a rack-and-pinion mechanism (not shown). The lateral ends of the medium fed on the medium feeding path T3 are guided by the edge guides 23a and 23b.

Referring back to FIGS. 3 and 4, the feed roller pair 15 that feeds the medium to a position opposing the record head 17 includes a feed roller 15a and a nip roller 15b. The feed roller 15a is powered by the transport motor 53 (see FIG. 9). The nip roller 15b is retractable from the feed roller 15a, is pushed against the feed roller 15a by a spring (not shown), and is driven to rotate while nipping the medium with the feed roller 15a.

The record head 17, which is an example of the recording unit, and a medium support portion 18 are opposed downstream from the feed roller pair 15. The record head 17 of this embodiment is configured as an ink jet record head that ejects ink. The medium support portion 18 defines the gap between the record head 17 and the medium by supporting the medium by supporting a medium. A carriage 16 provided with the record head 17 is configured to be moved back and forth along the width of the medium in the X-axis direction by the power from a carriage motor 51 (see FIG. 9) controlled by a control unit 50 (see FIG. 9). The carriage 16 can be displaced in the Z-axis direction by an adjusting mechanism 49 (see FIG. 9) controlled by the control unit 50 (see FIG. 9). The interval between the record head 17 and the medium support portion 18 can be adjusted by the adjusting mechanism 49. The adjusting mechanism 49 is constituted by, for example, a motor and a cam mechanism (not shown).

The discharge roller pair 19 is disposed downstream from the record head 17 and the medium support portion 18. The discharge roller pair 19 includes a feed roller 19a and a nip roller 19b. The feed roller 19a is powered by the transport motor 53 (see FIG. 9). The nip roller 19b is retractable from the feed roller 19a, is pushed against the feed roller 19a by a spring (not shown), and is driven to rotate while nipping the medium with the feed roller 19a. The medium subjected to printing is discharged outside of the apparatus by the discharge roller pair 19 and is supported by the medium receiving tray 21.

Figure 9:
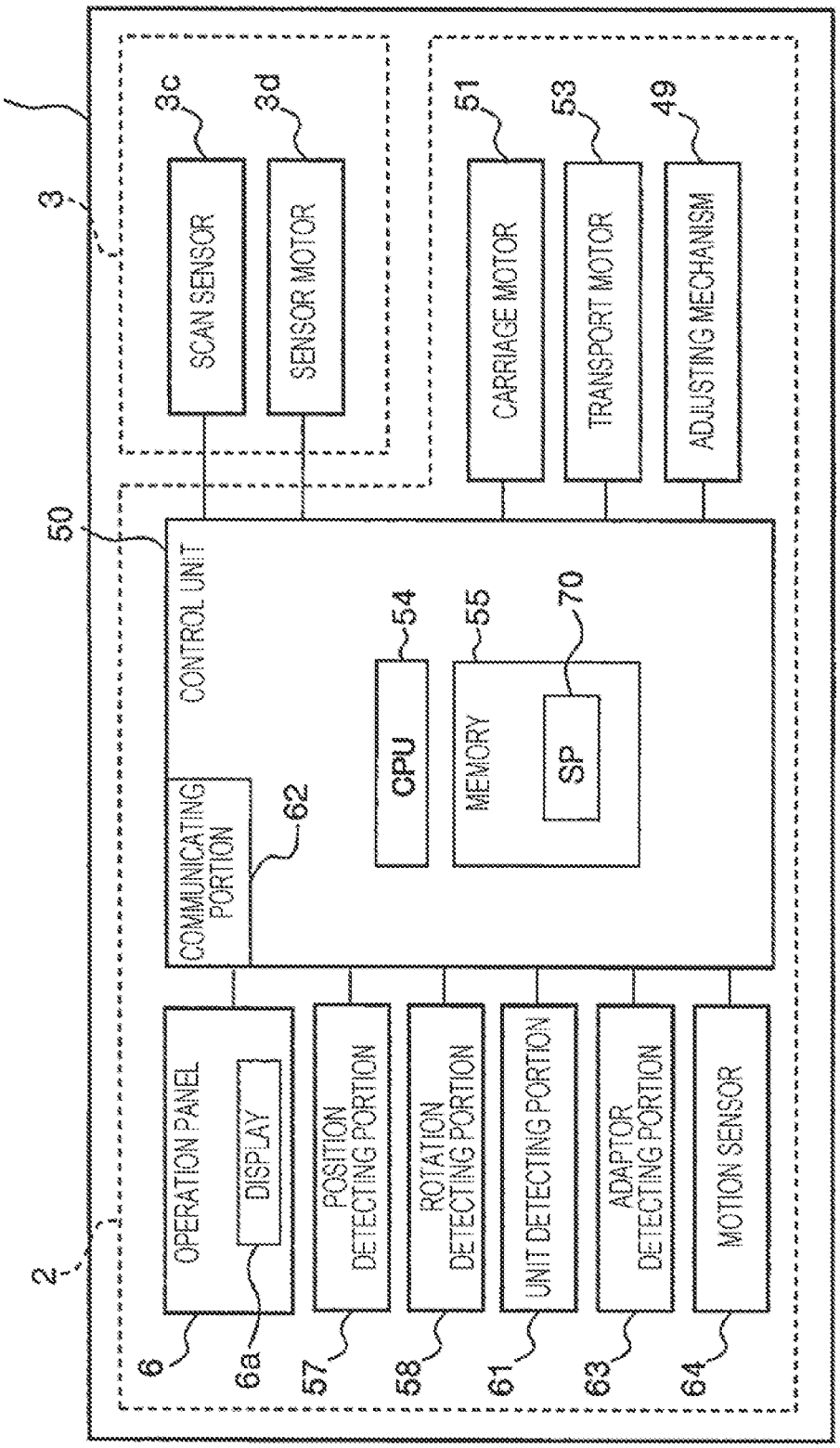
FIG. 9 is a block diagram illustrating the control system of the printer.

Referring next to FIG. 9, the control system of the printer 1 will be described. The control unit 50 controls the various operations of the printer 1, such as feeding, transporting, recording, and discharging a medium in the apparatus main body 2, and an original scanning operation in the scanner 3. The control unit 50 receives a signal from the operation panel 6 and transmits a signal for implementing the UI of the operation panel 6 to the operation panel 6.

The control unit 50 controls the carriage motor 51, the transport motor 53, and the sensor motor 3d. In this embodiment, the motors are direct-current (DC) motors. The control unit 50 also receives detection signals from a position detecting portion 57, a rotation detecting portion 58, a first medium detecting portion 59, a second medium detecting portion 60, a unit detecting portion 61, an adaptor detecting portion 63, and a motion sensor 64.

The position detecting portion 57 is a linear encoder, which is a detector for detecting the position of the carriage 16 in the X-axis direction. The rotation detecting portion 58 is a rotary encoder, which is a detector for detecting the amount and the rate of rotation of the transport motor 53.

The unit detecting portion 61 is a detector disposed at the position of the apparatus main body 2 where the reversing unit 24 (see FIG. 5) is to be attached to detect whether the reversing unit 24 is attached to the apparatus main body 2. The unit detecting portion 61 of this embodiment is a contact sensor. When processing using the unit detecting portion 61 is not needed, the unit detecting portion 61 may be omitted.

The adaptor detecting portion 63 is a detector disposed at the position of the apparatus main body 2 where the adaptor 23 (see FIG. 4) is to be attached to detect whether the adaptor 23 is attached to the apparatus main body 2. The adaptor detecting portion 63 of this embodiment is a contact sensor. When processing using the adaptor detecting portion 63 is not needed, the adaptor detecting portion 63 may be omitted.

The motion sensor 64 is disposed at the back of the apparatus main body 2 (see FIG. 5). The motion sensor 64 in this embodiment is an infrared sensor, which detects a change in the amount of infrared rays when a person has come close thereto. This enables the control unit 50 to detect the approach of the person to the back of the printer 1. When processing using the motion sensor 64 is not needed, the motion sensor 64 may be omitted.

The first medium detecting portion 59 is a detector that is disposed upstream from the feed roller pair 15, as shown in FIG. 3, to detect passage of the leading end and the trailing end of the medium. In using the medium feeding path T3 shown in FIG. 4, when the leading end of the medium inserted by the user passes through the position detected by the first medium detecting portion 59, the control unit 50 bleeps from a speaker (not shown) and starts to rotate the feed roller pair 15 to feed the inserted medium downstream. The first medium detecting portion 59 may be a contact or non-contact sensor.

The second medium detecting portion 60 is a detector disposed at the position of the carriage 16 facing the medium and is used to detect the edge positions of the medium in the Y-axis direction and the edge positions in the X-axis direction. The second medium detecting portion 60 may be an optical sensor including a light emitter that emits detection light and a light receiver that receives reflected light from the medium.

The control unit 50 includes a central processing unit (CPU) 54 and a memory 55. The CPU 54 performs various processes according to programs stored in the memory 55 to control various operations of the apparatus main body 2 and the scanner 3. The memory 55 is a readable and writable non-volatile memory, which stores programs for controlling the various operations of the apparatus main body 2 and the scanner 3 and various parameters. A control program ("SP" in FIG. 9) 70 stored in the memory 55 notifies a personal digital assistant 100 (described later) of the state of the printer 1 as necessary. The memory 55 also stores various kinds of setting information input by the user via the operation panel 6.

The control unit 50 also includes a communicating portion 62. The communicating portion 62 is a communication module for wireless communication with an external device, and in this embodiment, a communication module for wireless communication according to a Wi-Fi system. Wi-Fi is a system for executing wireless communication according the IEEE802.11 standard, which is an international standard. The name "Wi-Fi" is a trademark of the Wi-Fi Alliance. However, the communicating portion 62 may be any of wireless communication modules based on the Bluetooth system conforming to the international standard IEEE802.15.1, infrared communication, and other wireless communications. The communicating portion 62 may include two or more of the above communication modules.

Figure 8:
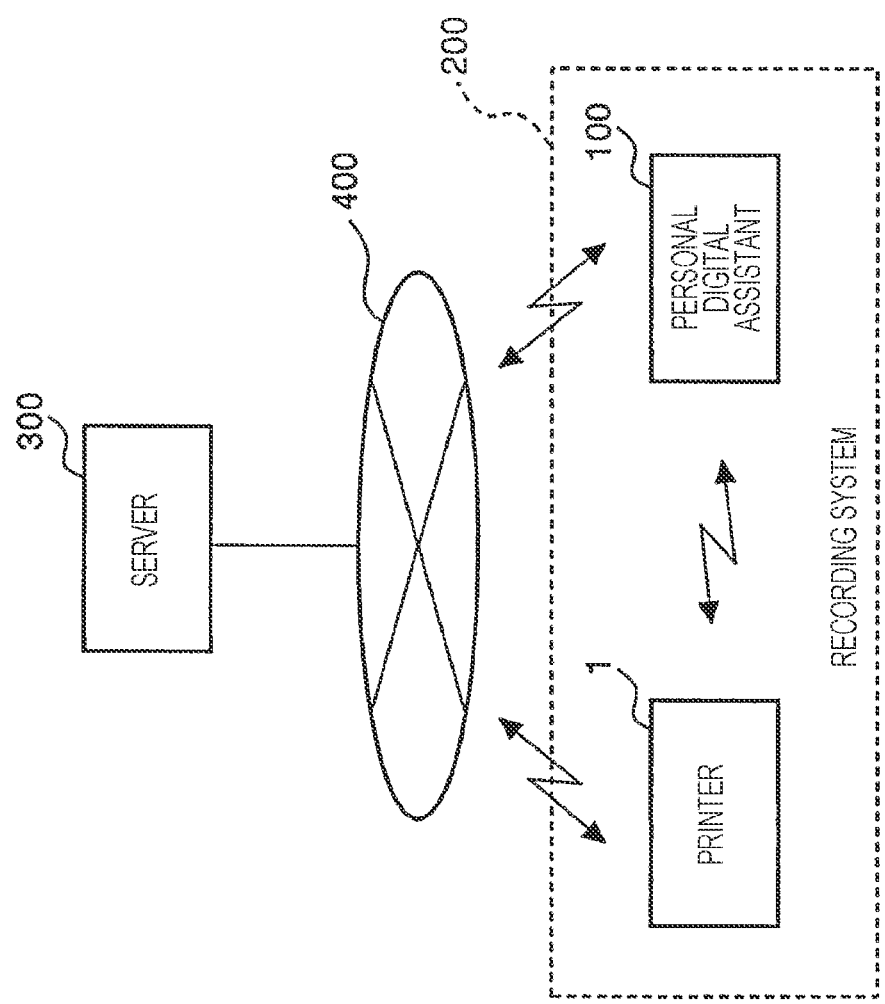
FIG. 8 is a block diagram illustrating the connection among the printer, a personal digital assistant, and a server.

The printer 1 with the above configuration constitutes a recording system 200 together with the personal digital assistant 100 configured to communicate with the printer 1, as shown in FIG. 8. An example of the personal digital assistant 100 is a smartphone. In this embodiment, the printer 1 and the personal digital assistant 100 can connect to a network 400 and can transmit and receive data to and from a server 300 at a remote location over the network 400.

Figure 10:
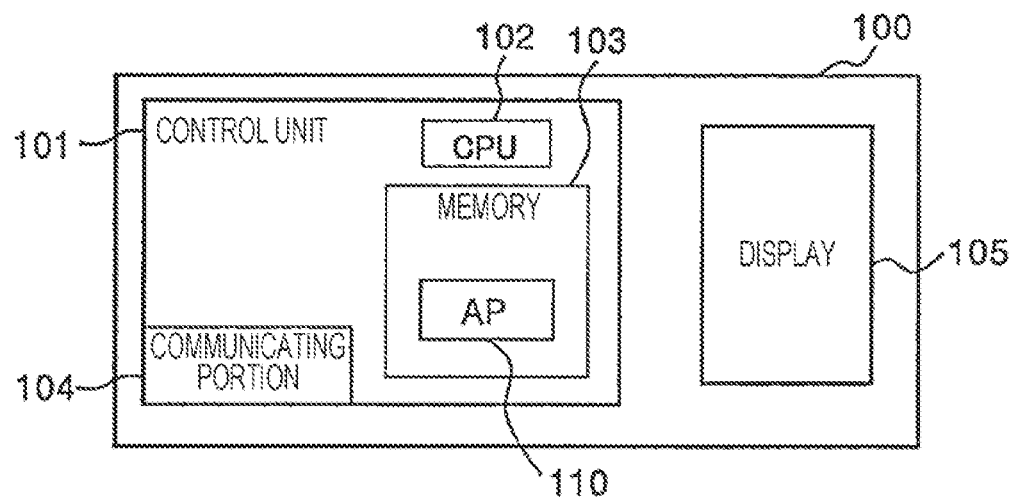
FIG. 10 is a block diagram illustrating the control system of the personal digital assistant.

The personal digital assistant 100 includes a control unit 101 and a display 105, as shown in FIG. 10. The display 105 in this embodiment is a touch panel and implements a UI that displays various kinds of information and receives various setting operations performed by the user. The user performs various setting operations and executing operations according the UI displayed on the display 105.

The control unit 101 receives a signal from the display 105 and transmits a signal for implement the UI of the display 105 to the display 105. The control unit 101 includes a CPU 102 and a memory 103. The CPU 102 performs various processing operations according to programs stored in the memory 103 to control the display 105. The memory 103 is a readable and writable non-volatile memory in which programs to be executed by the CPU 102 and various parameters are stored. An application program (referred to as "AP" in FIG. 10 and the subsequent drawings) 110 stored in the memory 103 is a program for causing the CPU 102 to execute the step of the display 105 displaying information on an operation method on the basis of an event that occurred when a medium is to be fed from the back of the printer 1, the method being to be performed after the event occurred (the details of which will be described later).

In this specification, "an event that occurred when a medium is to be fed from the back of the printer 1" includes an operation and an action that the user performs when feeding a medium from the back of the printer 1, detection of the operation and the action by the printer 1, and processing performed by the printer 1 as a result of the detection of the operation and the action. The operation includes detaching the reversing unit 24 and attaching the adaptor 23, and the action includes approach of the user to the back of the printer 1. The processing performed by the printer 1 as a result of the detection of the operation and the action includes notifying the personal digital assistant 100 of the detection of the operation and the action.

The control unit 101 includes a communicating portion 104. The communicating portion 104 includes a communication module for mobile communication and also a communication module for wireless communication based on the Wi-Fi system. The communicating portion 104 may include a communication module for wireless communication based on the Bluetooth system, infrared communication, or another wireless communication. The communicating portion 104 needs to be configured at least to establish communication with the printer 1.

Figure 11:
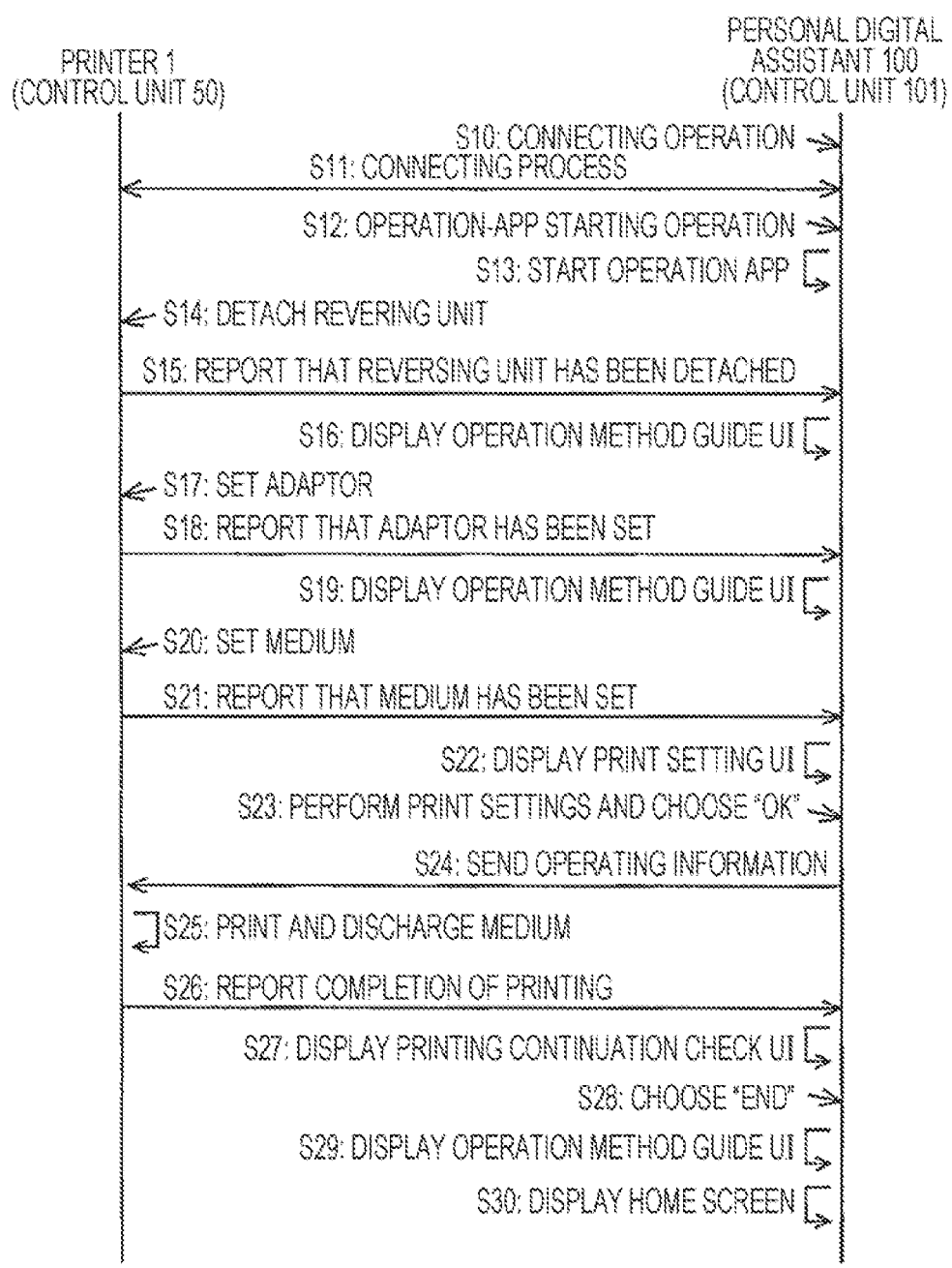
FIG. 11 is a sequence chart illustrating the relationship between control of the printer and the personal digital assistant and operations performed by the user.

Referring next to FIG. 11, the processing procedure for the control unit 50 of the printer 1 and the control unit 101 of the personal digital assistant 100 will be described in combination with user operation. The processing performed by the control unit 50 of the printer 1 will be described as processing performed by the printer 1 for ease of explanation. Likewise, the processing performed by the control unit 101 of the personal digital assistant 100 will be described as processing performed by the personal digital assistant 100.

When the user performs an operation for connecting to the printer 1 with the personal digital assistant 100 (step S10), the printer 1 and the personal digital assistant 100 perform connection processing (step S11). In order to make it easy for the user to obtain a service set identifier (SSID) and a password for identifying the Wi-Fi network from the back of the printer 1, a two-dimensional coded SSID and a password may be displayed on a lower back 2_a_, which is exposed when the extension support portion 12B is drawn upward, as shown in FIG. 5. An example of the two-dimensional code is a quick response (QR) code. The name QR code is a registered trademark of Denso Wave Incorporated.

Alternatively, the printer 1 may include a communicating portion, at the back, for wireless communication based on a near field communication (NFC) system, so that the personal digital assistant 100 can obtain an SSID and a password by the NFC communication.

Next, when the user performs an operation for starting a printer 1 operation app, that is, an AP 110 (see FIG. 10), in the personal digital assistant 100 (step S12), the personal digital assistant 100 starts up the AP 110 (step S13). When the user detaches the reversing unit 24 (see FIG. 5) from the back of the printer 1 in that state (step S14), the printer 1 notifies the personal digital assistant 100 that the reversing unit 24 has been detached (step S15). In response to it, the personal digital assistant 100 displays a UI for guiding the subsequent operation method (step S16).

Figure 13:
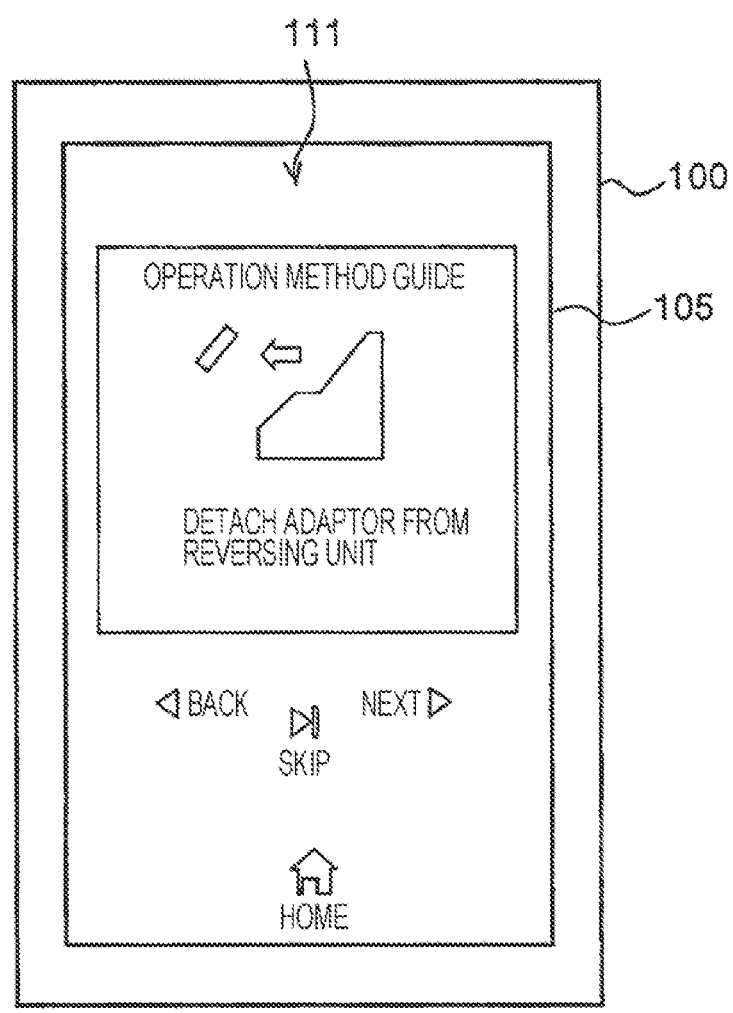
FIG. 13 is a diagram illustrating an example of a screen for guiding a user operation method.
Figure 14:
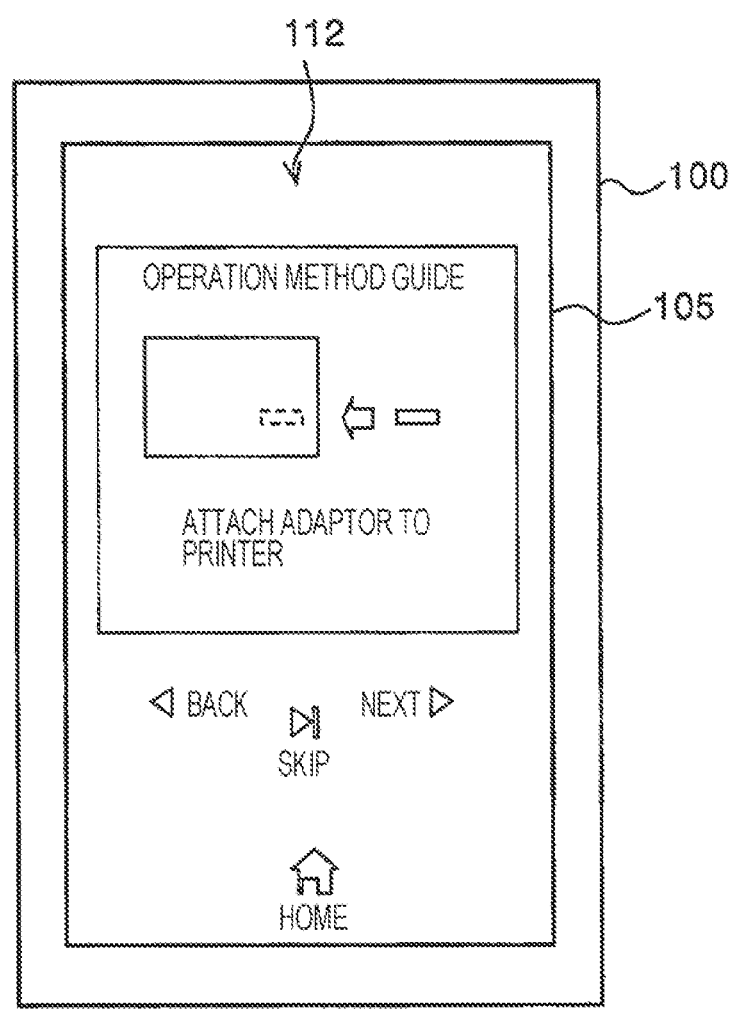
FIG. 14 is a diagram illustrating an example of a screen for guiding a user operation method.

This UI includes a message that guides a user operation method, a still image or a moving image illustrating the operation method, and various operation buttons for receiving user operations, like a screen 111 illustrated in FIG. 13 and a screen 112 illustrated in FIG. 14. For example, the screen 111 in FIG. 13 displays a message "Detach the adaptor from the reversing unit" and a still image that schematically illustrates it. When the user presses "Next" in FIG. 13, a message "Attach the adaptor to the printer" and a still image that schematically illustrates it are displayed, like the screen 112 in FIG. 14. Adding at least one of a still image and a moving image to the information on the user operation method makes it easy for the user to visually understand the user operation method. When the user presses "Skip", the processing goes to step S22 (described later) in this embodiment.

Figure 15:
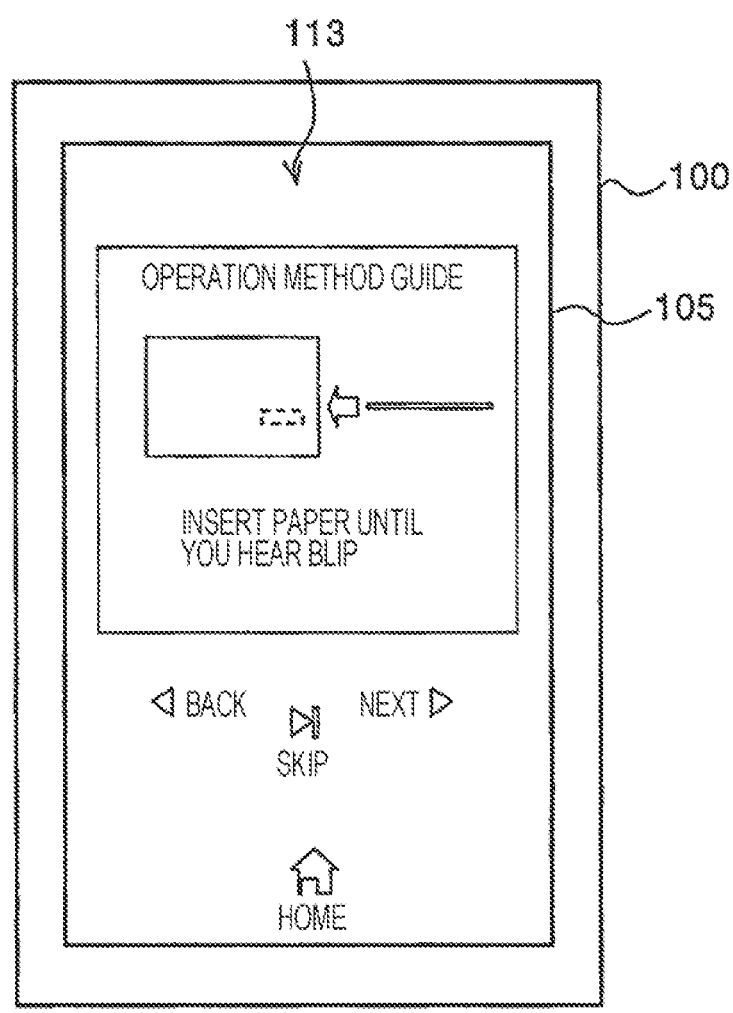
FIG. 15 is a diagram illustrating an example of a screen for guiding a user operation method.

Next, when the user sets the adaptor 23 in the printer (step S17), the printer 1 notifies the personal digital assistant 100 that the adaptor 23 has been set (step S18). In response to it, the personal digital assistant 100 displays a UI that guides a subsequent user operation method (step S19). This UI includes a message "Insert paper until you hear blip" and a still image that schematically illustrates it, as a screen 113 in FIG. 15 shows.

In response to it, when the user sets a medium on the medium feeding path T3 of the printer 1 (step S20), the printer 1 notifies the personal digital assistant 100 that a medium has been set (step S21). In response to it, the personal digital assistant 100 display a print setting UI on the display 105 (step S22). This print setting UI provides a UI for setting the size and the kind of the medium and its recording quality. Examples of the medium kind include plain paper and glossy paper, and examples of the recording quality include "ordinary" and "high".

When the user performs various print settings and chooses "OK" (step S23), the personal digital assistant 100 transmits the operating information to the printer 1 (step S24). In response to it, the printer 1 performs recording on the medium and discharges the printed medium (step S25). Upon completion of it, the printer 1 notifies the personal digital assistant 100 of the completion of printing (step S26). In response to it, the personal digital assistant 100 displays a UI that asks whether to continue the printing (step S27). Here, a UI for the user to choose "Do you continue printing?" or "Do you end printing?" is provided.

If the user chooses to continue printing, then the processing returns to step S19. If the user chooses to end printing (step S28), then personal digital assistant 100 displays a UI that guides a subsequent user operation method on the display 105 (step S29). Examples of the guide include operations of detaching the adaptor 23 from the printer 1, attaching the adaptor 23 to the reversing unit 24, and attaching the reversing unit 24 to the printer 1.

When the operation guide at step S29 ends, or when skip of the operation guide is chosen by the user, the personal digital assistant 100 displays a home screen on the display 105 (step S30).

Figure 12:
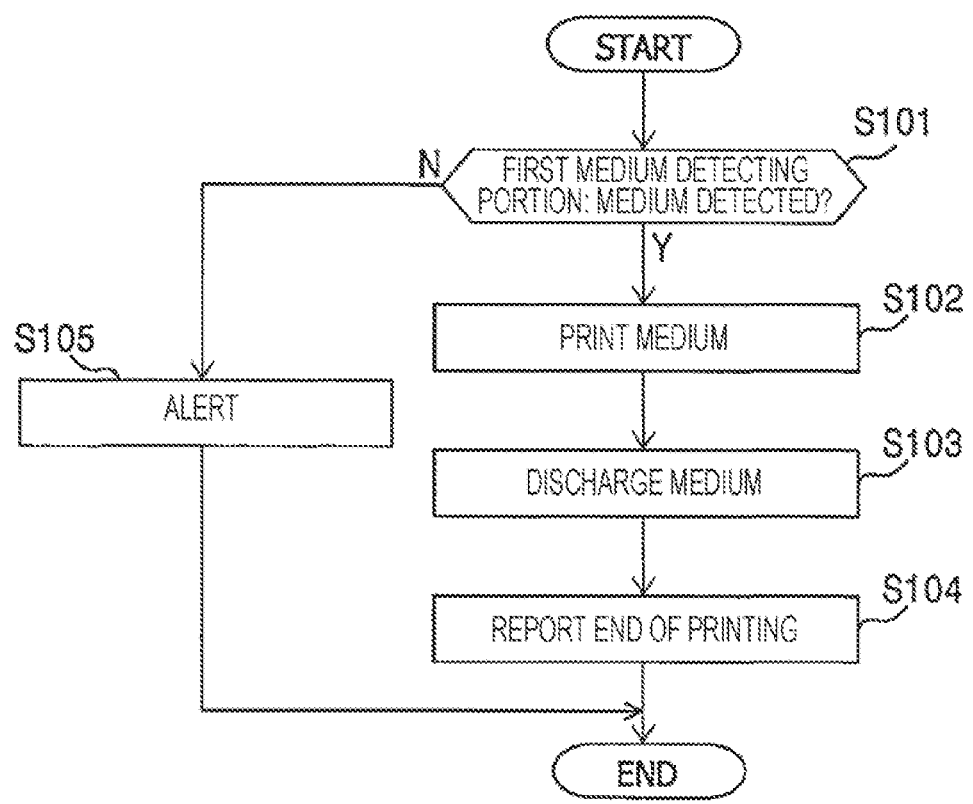
FIG. 12 is a flowchart illustrating the control procedure of the printer.

Referring to FIG. 12, the processing procedure of the printer 1 at step S25 in FIG. 11 will be described. Upon receiving operating information from the personal digital assistant 100, the printer 1 determines whether the first medium detecting portion 59 (see FIG. 4) has detected a medium (step S101). If no medium is detected (step S101: No), then the printer 1 generates an alert (step S105). Examples of the alert include sounding a beep from the speaker (not shown) of the printer 1 and displaying warning that no medium is set on the operation panel 6 of the printer 1. The printer 1 may transmit information indicating that no medium is set to the personal digital assistant 100. In response to it, the personal digital assistant 100 may display an alert indicating that no medium is set on the display 105.

In contrast, if a medium has been detected (step S101: Yes), then the printer 1 performs recording on a medium (step S102), discharges the printed medium (step S103), and notifies the personal digital assistant 100 that printing has ended (step S104 and step S26 in FIG. 11).

As described above, the AP 110 is a program to be executed in the personal digital assistant 100 to operate the printer 1 from the personal digital assistant 100 and causes the personal digital assistant 100 to execute the steps (steps S16, S19, and S29 in FIG. 11) for displaying information on the user operation methods after the events that have occurred when a medium is to be fed from the back of the printer 1 (steps S15 and S18 in FIG. 11) on the display 105 of the personal digital assistant 100. When the printer 1 detects the events that have occurred when a medium is to be fed through the medium feeding path T3 (steps S14 and S17 in FIG. 11), with the communication with the personal digital assistant 100 established, the printer 1 notifies the personal digital assistant 100 of the detection (steps S15 and S18 in FIG. 11, respectively). In the recording system 200 including the printer 1 and the personal digital assistant 100 configured to communicate with the printer 1, when the printer 1 detects the events that have occurred when a medium is to be fed from the back of the apparatus (steps S14 and S17 in FIG. 11), the printer 1 notifies the personal digital assistant 100 of the detection (steps S15 and S18 in FIG. 11). In response to the notification, the personal digital assistant 100 displays information on user operation methods subsequent to the events on the display 105 of the personal digital assistant 100, respectively. This allows the user to easily see the operation methods when feeding a medium from the back of the printer 1, improving the user convenience.

In the viewpoint of the AP 110, the above events include a notification from the printer 1 to the personal digital assistant 100 indicating that a unit, that is, the reversing unit 24, that closes the medium feeding path T3, which is a feeding path for feeding a medium from the back of the printer 1 has been detached (step S15 in FIG. 11). In other words, the fact that the reversing unit 24 has been detached from the back of the printer 1 indicates the intention of the user to feed a medium from the back of the printer 1. Since the event is a notification from the printer 1 to the personal digital assistant 100 that the reversing unit 24 has been detached from the back of the printer 1, an appropriate operation method corresponding to the action of the user can be presented.

In the viewpoint of the AP 110, the above events include a notification from the printer 1 to the personal digital assistant 100 indicating that the adaptor 23, which is a path forming member forming the medium feeding path T3, is attached to the printer 1 (step S18 in FIG. 11). In other words, the fact that the adaptor 23 is attached to the printer 1 indicates the intention of the user to feed a medium from the back of the printer 1. Since the above event is a notification from the printer 1 to the personal digital assistant 100 that the adaptor 23 has been attached to the printer 1, an appropriate operation method corresponding to the action of the user can be presented.

Figure 16:
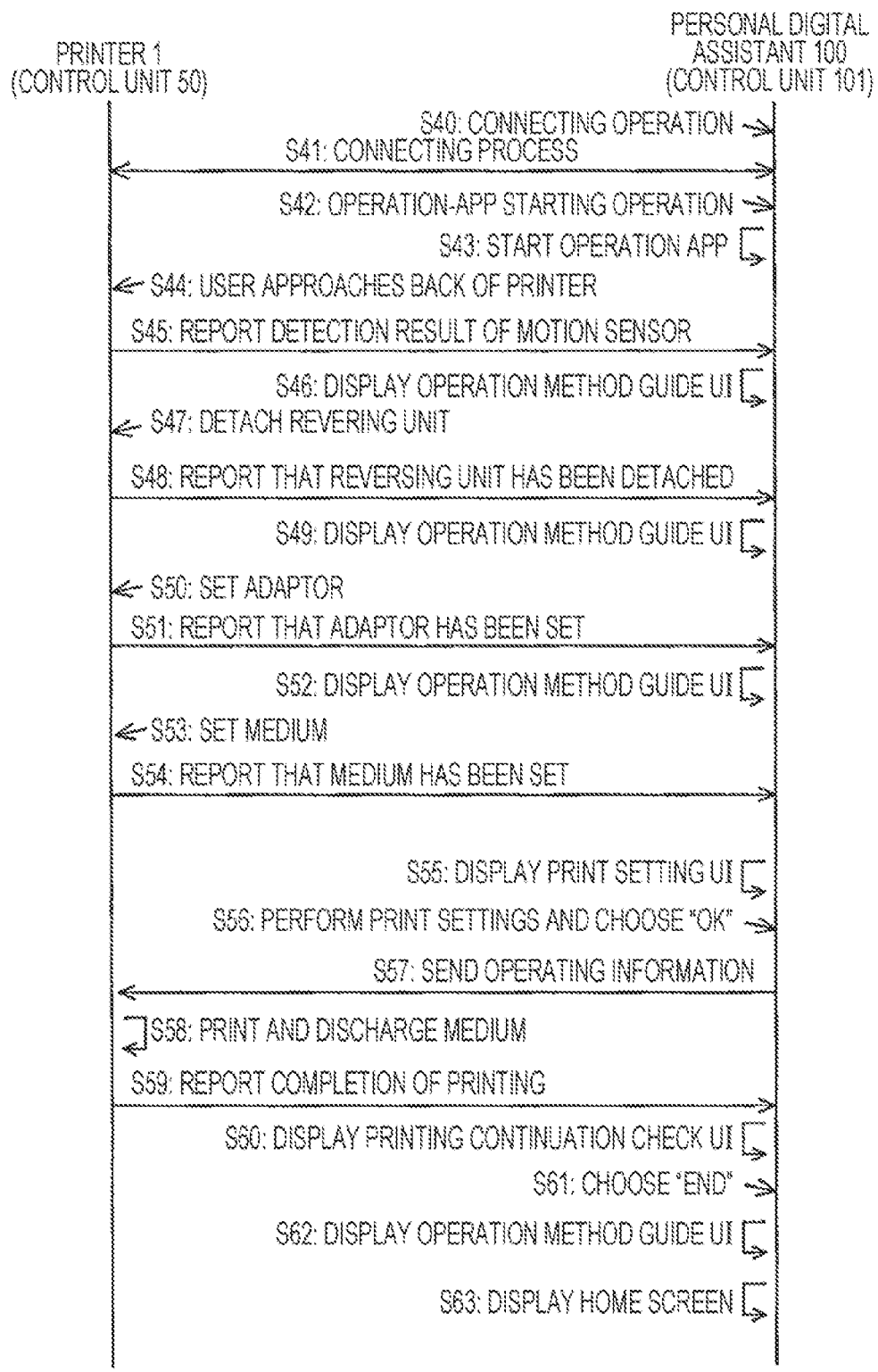
FIG. 16 is a sequence chart illustrating the relationship between control of the printer and the personal digital assistant and operations performed by the user.

Referring next to FIG. 16, another embodiment of the processing performed by the printer 1 and the personal digital assistant will be described. Since steps S40 to S43 in FIG. 16 are the same as steps S10 to S13 in FIG. 11, descriptions thereof will be omitted. In this embodiment, when the user approaches the back of the printer 1 (step S44), and the printer 1 detects the approach with the motion sensor 64 (see FIGS. 5 and 9), the printer 1 notifies the personal digital assistant 100 of the approach (step S45).

Figure 17:
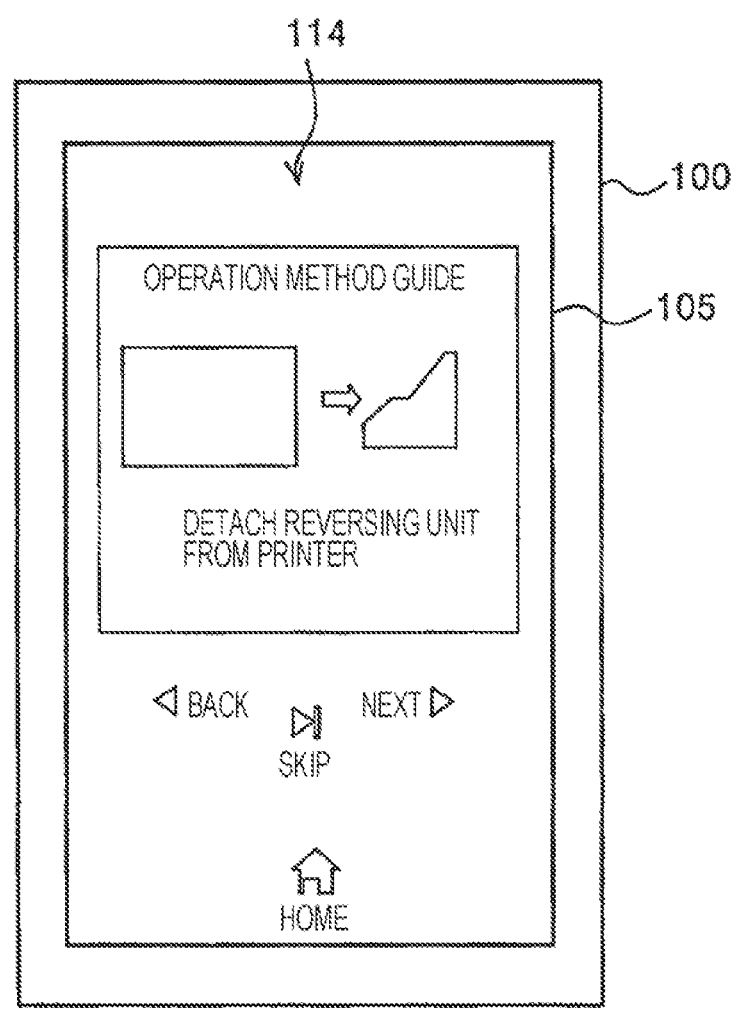
FIG. 17 is a diagram illustrating an example of a screen for guiding a user operation method.

In response to it, the personal digital assistant 100 displays a UI that guides a subsequent operation method for the user (step S46). This UI includes a message "Detach the reversing unit from the printer" and a still image that schematically illustrates it, as a screen 114 in FIG. 17 shows. When the user detaches the reversing unit 24 from the printer 1 in response to it (step S47), the printer 1 notifies the personal digital assistant 100 that the reversing unit 24 has been detached (step S48). Since the subsequent steps S49 to S63 are the same as steps S16 to S30 described with reference to FIG. 11, descriptions thereof will be omitted.

Thus, also in this embodiment, the AP 110, which is a program executed in the personal digital assistant 100 to operate the printer 1 from the personal digital assistant 100, causes the personal digital assistant 100 to execute the steps (steps S46, S49, S52, and S62 in FIG. 16) for displaying information on the user operation methods after the events that have occurred when a medium is to be fed from the back of the printer 1 on the display 105 of the personal digital assistant 100 on the basis of the event. This allows the user to easily see the operation methods when feeding a medium from the back of the printer 1, improving the user convenience. In this embodiment, the events include a notification from the printer 1 to the personal digital assistant 100 that the motion sensor 64 disposed at the back of the printer 1 has detected a person.

In other words, the fact that the motion sensor 64 disposed at the back of the printer 1 has detected a person indicates a possibility that the user will feed a medium from the back of the printer 1. Since the above event is a notification from the printer 1 to the personal digital assistant 100 that the motion sensor 64 disposed at the back of the printer 1 has detected a person, an appropriate operation method corresponding to the action of the user can be presented.

The embodiments described above may be as follows:

(1) The user operation methods may be displayed not only on the display 105 of the personal digital assistant 100 but also on the operation panel 6 of the printer 1. In this case, the same information may be displayed on both of them. This improves the user convenience. The display on the display 105 of the personal digital assistant 100 and the display on the operation panel 6 of the printer 1 may be synchronized with each other. For example, when one of the screens has changed, the other screen may also be changed at the same timing. This further improves the user convenience.

(2) The information on the user operation methods may be stored either in the memory 103 of the personal digital assistant 100 or in the memory 55 of the printer 1. In this case, the personal digital assistant 100 obtains the information on the user operation methods from the printer 1 by wireless communication. Alternatively, the information on the user operation methods may be stored in the server 300 of FIG. 8. In this case, the personal digital assistant 100 obtains the information on the user operation methods from the server 300 over the network 400.

(3) Examples of events that occur when a medium is to be fed from the back of the printer 1 are detaching the reversing unit 24 from the printer 1, attaching the adaptor 23 to the printer 1, and approach of the user to the printer 1. It is however needless to say that they are mere examples. For example, the events may include the user having chosen the medium feeding path T3 as a medium feeding path using the personal digital assistant 100.

(4) In the above embodiments, the approach of the user to the back of the printer 1 is detected by the motion sensor 64. Alternatively, the approach of the user to the back of the printer 1 may be determined when the printer 1 detects the angle of the personal digital assistant 100 to the printer 1 based on the incident angle of radio waves received from the personal digital assistant 100 and determines that the personal digital assistant 100 is positioned in the −Y direction from the back of the printer 1.

(5) Although in the above embodiments the AP 110, which is an application program of the personal digital assistant 100, is started by the user, the personal digital assistant 100 may automatically start the AP 110 on the basis of an event that occurred when a medium is to be fed from the back of the printer 1.

(6) The user operation from the back of the apparatus may include medium feeding using the medium feeding path T3 and also jam clearing. When a medium jammed in the apparatus is to be removed, the reversing unit 24 has to be detached from the apparatus main body 2. The occurrence of medium jam can be detected by the control unit 50 of the printer 1 on the basis of detected information from the first medium detecting portion 59 or the second medium detecting portion 60. Therefore, when the printer 1 detects the occurrence of medium jam, the printer 1 can notify the personal digital assistant 100 of the medium jam. In response to it, the personal digital assistant 100 can also display a method for removing the jammed medium on the display 105. When the personal digital assistant 100 receives a notification from the printer 1 that the user has approached the back of the printer 1, with jam in the apparatus detected, the personal digital assistant 100 can also display a method for jam clearing with higher priority than an operation method for feeding a medium using the medium feeding path T3.

It will be obvious to those skilled in the art that the present disclosure is not limited to the embodiments described above and that various modifications can be made within the scope of the claims of the disclosure and are also included in the scope of the present disclosure.

What is claimed is:

1. A non-transitory computer-readable storage medium storing a program executed in a personal digital assistant to operate a recording apparatus, including:
   a recording unit that performs recording on a medium, wherein the recording apparatus is operated from the personal digital assistant; and
   an operation panel at front of the recording apparatus, wherein
      the operation panel displays various kinds of information,
      the program causing the personal digital assistant to display, on a display of the personal digital assistant, information on a user operation method based on an event that occurred when a medium is to be fed from back of the recording apparatus, wherein
      the event includes:
         detecting that a unit that closes a feeding path for feeding the medium from the back of the recording apparatus was detached; and
         the recording apparatus notifying the personal digital assistant of the detection,
      the method is to be performed after the event occurred, and
   the recording apparatus is operable, by a user, from the back while viewing the display of the personal digital assistant.

2. The non-transitory computer-readable storage medium storing the program according to claim 1, wherein the event further includes:
   detecting that a path forming member forming a feeding path for feeding a medium from the back of the recording apparatus was attached to the recording apparatus; and
   the recording apparatus notifying the personal digital assistant of the detection.

3. The non-transitory computer-readable storage medium storing the program according to claim 1, wherein the event further includes:
   a motion sensor provided at the back of the recording apparatus detecting a person; and
   the recording apparatus notifying the personal digital assistant of the detection.

4. The non-transitory computer-readable storage medium storing the program according to claim 1, wherein the information on the user operation method includes at least one of a still image and a moving image.

5. A recording apparatus, comprising:
   a record head that performs recording on a medium;
   an operation panel at front of the recording apparatus, wherein the operation panel displays various kinds of information;
   a feeding path that feeds a medium from back of the recording apparatus including the record head; and
   a central processing unit (CPU) that performs various controls of the recording apparatus, wherein
      when the CPU detects an event that occurred when a medium is to be fed through the feeding path in a state in which communication with a personal digital assistant is established, the CPU notifies the personal digital assistant of the detection,
      the event includes detecting that a unit that closes the feeding path for feeding the medium from the back of the recording apparatus was detached, and
      the recording apparatus is operable, by a user, from the back while viewing a display of the personal digital assistant.

6. A recording system, comprising:
   a recording apparatus that performs recording on a medium, wherein
      the recording apparatus includes an operation panel at front of the recording apparatus, and
      the operation panel displays various kinds of information; and
   a personal digital assistant configured to communicate with the recording apparatus, wherein
      when the recording apparatus detects an event that occurred when a medium is to be fed from back of the recording apparatus, the recording apparatus notifies the personal digital assistant of the detection,
      the event includes detecting that a unit that closes a feeding path for feeding the medium from the back of the recording apparatus was detached,
      in response to the notification, the personal digital assistant displays information on a user operation method subsequent to occurrence of the event on a display of the personal digital assistant, and
      the recording apparatus is operable, by a user, from the back while viewing the display of the personal digital assistant.

7. The recording system according to claim 6, wherein the operation panel of the recording apparatus and the display of the personal digital assistant display same information.

8. The recording system according to claim 7, wherein display on the operation panel of the recording apparatus and display on the display of the personal digital assistant are synchronized with each other.

* * * * *